United States Patent [19]

Kanayama et al.

[11] Patent Number: 5,137,746
[45] Date of Patent: Aug. 11, 1992

[54] PRODUCTION OF FROZEN SURIMI

[75] Inventors: Tatsuo Kanayama, Takarazuka;
Toshitaka Nakashima, Itami;
Kunihiko Tomiyasu, Takarazuka;
Toshio Matsuda, Itami, all of Japan

[73] Assignee: Ueno Seiyaku Kabushiki Kaisha, Osaka, Japan

[21] Appl. No.: 688,632

[22] Filed: Apr. 19, 1991

Related U.S. Application Data

[63] Continuation of Ser. No. 559,422, Jul. 26, 1990, abandoned, which is a continuation of Ser. No. 326,423, Mar. 22, 1989, abandoned, which is a continuation of Ser. No. 933,907, Nov. 24, 1986, abandoned.

[30] Foreign Application Priority Data

Nov. 29, 1985 [JP] Japan ................................ 60-270180

[51] Int. Cl.$^5$ ............................................. A23L 1/325
[52] U.S. Cl. .................................................. 426/643
[58] Field of Search ............................ 426/104, 643

[56] References Cited

U.S. PATENT DOCUMENTS

| | | | |
|---|---|---|---|
| 4,181,749 | 1/1980 | Niki et al. | 426/643 |
| 4,464,404 | 8/1984 | Ueno et al. | 426/574 |

FOREIGN PATENT DOCUMENTS

| | | | |
|---|---|---|---|
| 3185 | 2/1970 | Japan | 426/643 |
| 47-23385 | 6/1972 | Japan . | |
| 34957 | 3/1978 | Japan | 426/643 |
| 75357 | 7/1978 | Japan | 426/643 |
| 2363 | 1/1979 | Japan | 426/643 |

OTHER PUBLICATIONS

"New Approach to Improve the Quality of Minced Fish Products from Freeze-Thawed Cod and Mackerel", Shann-Tzong Jiang, C. C. Lan, and Ching-Yu Tsao, *Journal of Food Service*, vol. 51, No. 2, 1986.
"Fish Meat Minced Products and Application Thereof", Minoru Okada, Japan, 1974.
"Fish Product", Fuyuo Ota, Hydrogenation Techniques, Japan, 1980.

*Primary Examiner*—Arthur L. Corbin
*Attorney, Agent, or Firm*—Wegner, Cantor, Mueller & Player

[57] ABSTRACT

The present invention relates to a method of producing frozen surimi that does not contain a substantial amount of phosphate additives. According to the disclosed method, carbonates and/or bicarbonates in combination with an organic alkaline salt are added to dehydrated minced fish meat to adjust the pH value of the meat to less than 7.5, and the obtained surimi and surimi based products have an excellent whiteness and good elasticity.

6 Claims, No Drawings

PRODUCTION OF FROZEN SURIMI

This application is a continuation of U.S. application Ser. No. 07/559,422 filed Jul. 26, 1990; which is a continuation of 07/326,423 filed Mar. 22, 1989, which is a continuation of Ser. No. 06/933,907 filed Nov. 24, 1986; all now abandoned.

BACKGROUND OF THE INVENTION

The present invention relates to a method of producing frozen minced fish meat (referred to as "frozen surimi").

Conventionally, frozen surimi has been produced by the process in which minced fish meat obtained from a fish meat, such as pollack, is subjected to two or more washes with fresh water, with the addition of a small amount of common salt to the fresh water used at the last wash step, removal of skin by a refiner where necessary, dehydrating by a screw-press, and then mixing with the addition of sugars or sugar alcohols, polyphosphates, etc. Finally the product is packed and stored under refrigeration at minus 20° C.-30° C. until delivery.

Recently, however, the human intake of phosphates, such as polyphosphates which are used as additives in foods, has a tendency to increase, because of increased public consumption of processed foods. This tendency has been raising an apprehension concerning public health, because excessive intake of phosphates will lead to calcium deficiency due to an imbalance between calcium and phosphate in human bodies. It is desirable, therefore, to reduce phosphate content in foods, including frozen surimi. Frozen surimi meat containing no added phosphate is now a goal of the fish processing industry.

In connection with this, a method for the complete elimination of phosphates, such as polyphosphates, from frozen surimi was proposed under a Japanese Patent (Toku Ko Sho No. 47-23385). The method disclosed consists of adjusting the pH of minced fish meat (raw surimi) that has been mixed with additives to a value within the range of pH 7.5-9.0 before it is put into storage under refrigeration, thereby preserving unimpaired the quality of the protein for long periods of time.

The above-stated method involves disadvantages however. Surimi preserved under refrigeration at such a high pH value tends to undergo premature "suwari" (increase of elasticity) when it is thawed. Though suwari is a necessary property for surimi based products, premature suwari (before production of the suwari based products) gives products undesirable properties. In addition, the suwari thus treated undergoes deterioration relating to color, especially the loss of whiteness. Therefore, the above method has not been commercially practiced, where whiteness affects the value of he meat, such as surimi made from pollack.

Also under a Japanese Patent (Toku Kai Sho No. 48-96750), it was proposed that an aqueous solution formed of a weak acid and a base be used instead of phosphates for the same purpose.

The second-mentioned method above is useful to give frozen surimi a good elasticity (a property called "ashi"). However, the fish meat processed by this method cannot be kept for long periods under refrigeration. Within this method it is advantageous to use tertiary calcium phosphate instead of polyphosphate, therefore the second-mentioned method does not reduce intake of phosphates.

In previous attempts to produce frozen surimi containing no added phosphates, there has been no disclosure of a process to produce surimi which can be well preserved for a long period and is excellent in whiteness, water holding capacity, and good elasticity (suwari) after thawing. Prior to this invention, surimi based products, such as "kamaboko", made of conventional frozen surimi containing no phosphate, have lacked good whiteness and good elasticity.

SUMMARY OF THE INVENTION

With the aforementioned problems taken into account, the present invention has for its object to provide a method of producing frozen surimi which can be processed into surimi based products exhibiting good whiteness and good elasticity even after long periods of cold storage.

The present invention provides a method of producing frozen surimi which comprises adding carbonates and/or bicarbonates to dehydrated minced fish meat during mixing of the fish meat in such a manner as to adjust the pH value of the minced fish meat (surimi) to less than 7.5, and freezing the mixed fish meat (surimi).

DETAILED DESCRIPTION OF THE INVENTION

The present invention provides a method of producing frozen surimi which comprises adding carbonates and/or bicarbonates to dehydrated minced fish meat during mixing of the fish meat in such a manner as to adjust the pH value of the minced fish meat (surimi) to less than 7.5, and freezing the mixed fish meat (surimi).

Frozen surimi is generally produced by removing the waste portions, such as heads, viscera, bones and skin, from raw fish, passing the fish through a holl-type separator to obtain minced fish meat, washing in fresh water, dehydrating, and then mixing the minced fish meat with a sugar, a polyphosphate, etc., and finally freezing.

However, as stated hereinbefore, the human intake of phosphorus, such as polyphosphates used as additives in foods, has increased because of increased public consumption of processed foods, and this increase has been raising an apprehension that the human intake of phosphorus may run to excess, causing calcium deficiency due to an imbalance between calcium and phosphorus in the body. It is desired, therefore, to reduce the phosphorus contents in foods and for the fish processing industry to stop using phosphorus additives in frozen surimi.

According to the present invention a carbonate and/or a bicarbonate is added, instead of polyphosphates, into dehydrated minced fish meat under grinding while adjusting the pH value to less than 7.5, before the fish meat is frozen.

The carbonates according to this invention include sodium carbonate, potassium carbonate, calcium carbonate and magnesium carbonate, of which sodium carbonate is the most preferable for use.

The bicarbonates according to the present invention include sodium bicarbonate, potassium bicarbonate, etc., sodium bicarbonate being the most preferable among them.

The carbonates according to the present invention may be added in a quantity of 0.02% by weight, or more, preferably within the range of 0.04-0.06% by weight, into the fish meat. An addition of less than 0.02% by weight is ineffective or brings about inadequate results.

The bicarbonates according to the present invention may be added in a quantity of 0.03% by weight, or more, preferably within the range of 0.05-0.15% by weight, into the fish meat. An addition of less than 0.03% by weight is ineffective or brings about inadequate results.

The carbonates and bicarbonates, according to the present invention, may be used in combination in any optional ratio insofar as the pH value of the washed minced fish meat is maintained at less than 7.5.

The carbonates and/or bicarbonates according to the present invention may be dispersed in sugars, sugar alcohols or starch hydrolysate.

The sugars and sugar alcohols according to the present invention include glucose, maltose, saccharose, lactose, maltitol, sorbitol, dextrine, etc.

The effect of a method embodying the present invention can be enhanced by the addition of organic acid salts and/or sodium chloride to the minced fish meat.

The organic acid salts may include sodium citrate, calcium citrate, sodium acetate, calcium acetate, sodium tartrate, calcium tartrate and sodium gluconate. The most preferable include sodium citrate and/or sodium gluconate.

The organic acid salts of the present invention may be added in a quantity of 0.1-0.5% by weight, preferably within the range of 0.1-0.2% by weight, into fish meat. The effect may be inadequate if the addition is less than 0.1% by weight and the whiteness may be unsatisfactory if the addition is over 0.5% by weight.

By adding the organic acid salts into the minced fish meat, the premature suwari can be effectively prevented while improvement of whiteness may be obtained due to the carbonates and/or bicarbonates.

The amount of sodium chloride to be added, when it is used, is preferably about 0.6-1% by weight into the dehydrated minced fish meat. An addition of common salt exceeding 1.0% by weight is liable to impair the elasticity of the surimi, whereas an addition below 0.6% by weight accelerates dehydration of the washed minced fish meat, increasing the dripping when the product is thawed producing unsatisfactory results.

Frozen surimi of the present invention may be improved further in quality, relating to both whiteness and elasticity, by adding surface-active agents for food or fatty compounds together with a surface-active agent for foods thereto. The surface-active agents for food according to the present invention are mono- or diglycerides of fatty acid, sugar esters, sorbitan fatty acid esters, propylene glycol fatty acid esters, lecithin, and polyoxyethylenesorbitan fatty ester, and a mixture formed therefrom.

The amount of the surface-active agents is preferably 0.05-1.0% by weight, most preferably 0.1-0.5% by weight, into the surimi. An addition below 0.05% by weight may be ineffective, whereas an addition over 1.0% by weight does not show any improvement but rather involves possibilities of adversely affecting the elasticity. A surface-active agent may be added alone or in the form of a mixture with fatty compounds.

When surface-active agents for food are added as stated above, it is preferable for them to be dispersed in sugars or sugar alcohols. It is also practical to prepare an O/W emulsion of the surface-active agents or dissolve or disperse them in an edible solvent such as ethanol and propylene glycol. Any means serves the purpose insofar as it is capable of dispersing the surface-active agents quickly and uniformly throughout the surimi.

The fatty compounds according to the present invention are triglycerides of fatty acids, higher fatty acids, esters of higher alcohols, etc., the triglycerides of the fatty acids being especially suitable. Specifically stated, some of the vegetable fats and oils suitable for the purpose are rapeseed oil, soybean oil, cotton seed oil, rice bran oil, corn oil, olive oil, and arachis oil. Animal fats and oils suitable for the purpose are butter fat, lard oil, fish oil, etc.

The additives used according to the present invention in the surimi with other additives for improvement according to a different method of minced fish meat processing.

The invention is applicable to the processing of Alaska pollack, Atka mackerel, Sardines, Mackerel, Pacific sauries, Cutlassfish, Sea eels, Flatfish, Horse mackerel, merlu and a mixture of any two kinds or more of them. The applicability of the invention is not restricted to the above-enumerated kinds.

Examples of the present invention are given hereunder.

EXAMPLES 1-7

The effect of sodium carbonate and/or sodium hydrogen carbonate at a pH value of less than 7.5.

Dehydrated minced fish meat is prepared according to the ordinary process from Walleye pollack caught on the preceding day, and is mixed so as to make the water content uniform throughout, and then, into every 5 kg of the meat, each as a test lot, is incorporated additives as shown in Table 1. Each lot of the resultant mixtures is made to form a uniform system by mixing for 5 minutes with a small silent cutter to give surimi. The obtained surimi is packed, 2.5 kg each in a polyethylene bag, and each bag of the surimi is frozen to a temperature of minus 30° C. by overnight refrigeration by means of an air-blast refrigerator and subsequently stored under refrigeration at minus 30° C.

After four months of cold storage under the above-stated condition, each test lot of the frozen surimi, packed for 2.5 kg each, is released from the cold storage and left standing overnight in a room to thaw under room temperature.

A 2 kg portion from each pack is put in a small silent cutter, common salt and potato starch are added thereto in quantities of 3% by weight and 5% by weight, respectively, and the mixture is kneaded in a small silent cutter for 13 minutes and then stuffed in a polyvinylidene chloride film with a lay-flat width of 48 mm. Part of the packed surimi is made into musuwari kamaboko (see Note below) by directly heating it in hot water at 90° C. for 30 minutes and the rest is made into suwari kamaboko (see Note below) by immersion in water at 30° C. for one hour first and then by heating in hot water at 90° C. for 30 minutes.

Note: "Musuwari kamaboko" means surimi which, immediately after defrosting, is cooked in hot water, whereas "suwari Kamaboko" means surimi which, after defrosting, is left standing in water or in a special chamber at room temperature for some hours for improvement of the elasticity and then cooked in hot water, kamaboko of both the two types being end products.

Table 1 shows the results of tests wherein the Hunter's whiteness, water drip, and jelly strength are determined with respect to kamaboko of both the musuwari and the suwari types as well as the thawed minced fish meat.

The Hunter's whiteness is determined by a digital color difference meter Model ND-101D (made by Nippon Denshoku Kogyo). The elasticity of kamaboko, represented in jelly strength W×L (g×cm), is determined by means of a food rheometer (made by Fudo Kogyo) using a globular plunger with a diameter of 5 mm. The water drip is determined in a manner in which thawed surimi weighing 50 g is put in a cylinder measuring 35 mm in diameter and 150 mm in length. The liquid drippings obtained by applying a load of 500 g twice, at the beginning and five to ten minutes later, for a twenty minute period are represented in a percentage against the weight of the specimen. In the water drip column − means "no drippings", ± means "oozes out", and + means "several drops". Suwari (elasticity) of thawed surimi is indicated by − meaning "good", ± meaning "tolerable", + meaning "not good", ++ meaning "bad (crumbles)".

inadequate and, moreover, the frozen surimi readily undergoes premature suwari when thawed.

When the addition of sodium carbonate is within the range from 0.02% by weight to 0.08% by weight, or that of sodium bicarbonate is within the range from 0.03% by weight to 0.2% by weight, and the surimi or kamaboko assumes a pH value not exceeding 7.5 (Examples 1-7), the surimi shows no water drip under pressure, does not undergo premature suwari when thawed, and kamaboko having satisfactory whiteness and adequate jelly strength becomes obtainable.

EXAMPLES 8-18

The effect of a salt of an organic acid.

Frozen surimi is prepared in a variety of compositions, as specified in Table 2, through a similar production process as in Example 1. After six months of cold storage at minus 30° C., the frozen surimi is made into musuwari kamaboko and suwari kamaboko in the same manner as in Example 1. The salts of each organic acid

TABLE 1

| Test lot | Additives (% by weight) | | | pH | | Hunter's whiteness (%) | | Water drip from thawed surimi (%) | Jelly strength (g × cm) | | Suwari (elasticity) of thawed surimi |
|---|---|---|---|---|---|---|---|---|---|---|---|
| | Sugar | Na$_2$CO$_3$ | NaHCO$_3$ | Surimi | Musuwari kamaboko | Surimi | Musuwari kamaboko | | Musuwari kamaboko | Suwari kamaboko | |
| C-1 | 6 | 0 | 0 | 7.05 | 7.03 | 21.9 | 37.2 | 3.5 | 320 | 305 | − |
| C-2 | 6 | 0.08 | 0 | 7.67 | 7.54 | 19.5 | 36.1 | − | 395 | 420 | + |
| C-3 | 6 | 0.10 | 0 | 7.75 | 7.69 | 19.0 | 35.9 | − | 380 | 430 | ++ |
| Ex. 1 | 6 | 0.02 | 0 | 7.27 | 7.18 | 21.0 | 37.5 | ± | 370 | 440 | − |
| Ex. 2 | 6 | 0.04 | 0 | 7.37 | 7.28 | 20.7 | 37.0 | − | 410 | 440 | − |
| Ex. 3 | 6 | 0.06 | 0 | 7.45 | 7.41 | 20.4 | 36.9 | − | 400 | 450 | − |
| C-4 | 6 | 0 | 0.20 | 7.70 | 7.80 | 19.3 | 35.3 | − | 400 | 440 | + |
| C-5 | 6 | 0 | 0.25 | 7.82 | 7.99 | 19.2 | 34.5 | − | 400 | 420 | ++ |
| Ex. 4 | 6 | 0 | 0.03 | 7.24 | 7.17 | 20.5 | 37.3 | ± | 360 | 400 | − |
| Ex. 5 | 6 | 0 | 0.05 | 7.28 | 7.26 | 20.1 | 37.1 | − | 380 | 430 | − |
| Ex. 6 | 6 | 0 | 0.10 | 7.39 | 7.38 | 20.0 | 36.7 | − | 390 | 450 | − |
| Ex. 7 | 6 | 0 | 0.15 | 7.48 | 7.45 | 19.5 | 36.1 | − | 410 | 470 | − |

C: Comparative Example
Ex.: Example of the present invention

As shown Table 1, when there is no addition of sodium carbonate or sodium hydrogen carbonate (test lot Comparative Example 1), the water drip from the surimi is large and the jelly strength of the kamaboko is poor.

On the contrary, when the addition of sodium carbonate is 0.08% by weight or more, or that of sodium hydrogen carbonate is 0.2% by weight or more, and the pH of the surimi or kamaboko is made to exceed 7.5 (Comparative Examples 2-5), the water drip from thawed surimi is reduced but the Hunter's whiteness is are dissolved in 50 ml distilled water so as to adjust the ion strength to 0.025 against surimi and are added to the surimi after adjusting the pH value to 7 with NaOH or HCl. The test results obtained in the same manner as in Example 1, with respect to both surimi and kamaboko, are shown in Table 2. The toughness of the surimi after thawing (meat temperature: 5° C.) is determined by means of a food rheometer (Model NRM-2002J made by Fudo Kogyo) and represented push strength W (g) applied to a globular plunger with a diameter of 5 mm.

TABLE 2

| Test lot | Salt of an organic acid | Additives (% by weight) | | | pH | | Hunter's whiteness (%) | | Water drip from thawed surimi (%) | Jelly strength (g × cm) | | Toughness of thawed surimi (g) |
|---|---|---|---|---|---|---|---|---|---|---|---|---|
| | | Sugar | Na$_2$CO$_3$ | Salt of organic acid | Surimi | Musuwari kamaboko | Surimi | Musuwari kamaboko | | Musuwari kamaboko | Suwari kamaboko | |
| C-6 | | 6 | 0 | 0 | 7.12 | 6.97 | 19.0 | 37.8 | 4.8 | 305 | 265 | 100 |
| Ex. 8 | | 6 | 0.04 | 0 | 7.31 | 7.21 | 18.0 | 37.3 | − | 340 | 410 | 103 |
| Ex. 9 | Na acetate | 6 | 0.04 | 0.21 | 7.34 | 7.31 | 18.2 | 37.5 | + | 290 | 340 | 108 |
| Ex. 10 | Na fumarate | 6 | 0.04 | 0.13 | 7.35 | 7.32 | 17.9 | 37.9 | + | 290 | 370 | 103 |
| Ex. 11 | Na succinate | 6 | 0.04 | 0.135 | 7.37 | 7.28 | 17.7 | 37.8 | + | 275 | 360 | 123 |
| Ex. 12 | Na tartarate | 6 | 0.04 | 0.16 | 7.31 | 7.29 | 18.1 | 37.9 | + | 290 | 370 | 103 |
| Ex. 13 | Na maleate | 6 | 0.04 | 0.15 | 7.36 | 7.29 | 18.1 | 37.6 | 1.8 | 260 | 340 | 113 |
| Ex. 14 | Na malonate | 6 | 0.04 | 0.12 | 7.31 | 7.27 | 17.9 | 36.2 | + | 305 | 380 | 95 |
| Ex. 15 | Na maleate | 6 | 0.04 | 0.13 | 7.32 | 7.27 | 18.1 | 36.1 | − | 235 | 235 | 88 |
| Ex. 16 | Na lactate | 6 | 0.04 | 0.28 | 7.34 | 7.24 | 17.5 | 35.9 | + | 290 | 380 | 103 |
| Ex. 17 | Na gluconate | 6 | 0.04 | 0.55 | 7.34 | 7.23 | 18.1 | 38.6 | + | 330 | 400 | 107 |

TABLE 2-continued

| Test lot | Additives (% by weight) | | | | pH | | Hunter's whiteness (%) | | Water drip from thawed surimi (%) | Jelly strength (g × cm) | | Toughness of thawed surimi (g) |
|---|---|---|---|---|---|---|---|---|---|---|---|---|
| | Salt of an organic acid | Sugar | Na$_2$CO$_3$ | Salt of organic acid | Surimi | Musuwari kamaboko | Surimi | Musuwari kamaboko | | Musuwari kamaboko | Suwari kamaboko | |
| Ex. 18 | Na citrate | 6 | 0.04 | 0.11 | 7.39 | 7.27 | 18.4 | 38.7 | — | 340 | 390 | 87 |

C: Comparative Example
Ex.: Example of the present invention by weight effectively lowers the Hunter's whiteness of surimi and kamaboko, some salts of organic acids counteract this lowering effect. Sodium acetate, sodium tartarate, sodium malate, sodium gluconate, and most remarkably, sodium citrate are effective for this purpose. With respect to the water drip from thawed surimi under pressure, whereas Test lot Comparative Example 6 shows a bad result of 4.8%, the addition of salts of organic acids, with the exception of sodium maleate, reduces the drip to several drops, and in particular, sodium citrate further stops the motor drip.

With respect to the toughness of the surimi after thawing, it is discovered that a malate salt and also a citrate salt can render the meat tender and viscous and prevent such meat from undergoing premature suwari (elasticity) when the meat is thawed. Sodium citrate and sodium gluconate, of all the salts of organic acids tested, do not affect the elasticity of musuwari kamaboko and suwari kamaboko.

From the above-described results shown in Table 2, it is concluded that sodium citrate is the most efficient of all salts of organic acids, when used in conjunction with Na$_2$CO$_3$, in view of the improvement of the Hunter's whiteness of both surimi and kamaboko, drip property and tendency to suwari after thawing of the surimi, and unimpaired elasticity.

EXAMPLES 19-26

Appropriate addition of sodium citrate:

Frozen surimi is prepared in a variety of compositions shown in Table 3, according to the same process as in Example 1. After three months of cold storage at minus 30° C., the frozen surimi is made into musuwari kamaboko and suwari kamaboko in the same manner as in Example 1. The test results obtained in the same manner as in Example 1, with respect to both the surimi and the kamaboko, are shown in Table 3.

TABLE 3

| Test lot | Additives (% by weight) | | | pH | | Hunter's whiteness (%) | | Water drip from thawed surimi (%) | Jelly strength (g × cm) | | Suwari (elasticity) of thawed surimi |
|---|---|---|---|---|---|---|---|---|---|---|---|
| | Sugar | Na$_2$CO$_3$ | Na citrate | Surimi | Musuwari kamaboko | Surimi | Musuwari kamaboko | | Musuwari kamaboko | Suwari kamaboko | |
| C-7 | 6 | 0 | 0 | 7.16 | 7.05 | 20.3 | 41.1 | 1.2 | 245 | 225 | — |
| Ex. 19 | 6 | 0.04 | 0 | 7.41 | 7.38 | 19.8 | 40.5 | — | 325 | 355 | — |
| Ex. 20 | 6 | 0.04 | 0.1 | 7.48 | 7.35 | 20.7 | 41.7 | — | 320 | 350 | — |
| Ex. 21 | 6 | 0.04 | 0.15 | 7.49 | 7.40 | 20.5 | 41.5 | — | 335 | 350 | — |
| Ex. 22 | 6 | 0.04 | 0.2 | 7.45 | 7.42 | 20.4 | 41.8 | — | 335 | 340 | — |
| Ex. 23 | 6 | 0.04 | 0.25 | 7.46 | 7.45 | 20.0 | 41.5 | — | 325 | 340 | — |
| Ex. 24 | 6 | 0.04 | 0.3 | 7.47 | 7.41 | 20.1 | 41.2 | — | 330 | 340 | — |
| Ex. 25 | 6 | 0.04 | 0.4 | 7.47 | 7.43 | 20.0 | 41.0 | — | 320 | 325 | — |
| Ex. 26 | 6 | 0.04 | 0.5 | 7.48 | 7.44 | 19.8 | 40.8 | — | 320 | 330 | — |

C: Comparative
Ex.: Example of the present invention

As shown in Table 3, the Hunter's whiteness of both surimi and kamaboko shows a distinct improvement when sodium citrate is added, compared with the specimen to which sodium citrate was not added.

With respect to the water drip from thawed surimi under pressure, whereas Test lot Comparative Example 7 registers 1.2%, the test lots prepared according to this invention (Examples 19-26) show no drip. The surimi shows no premature suwari at the time of thawing. The elasticity, with respect to both musuwari kamaboko and suwari kamaboko, is not adversely affected by the addition of sodium citrate.

The appropriate quantity of sodium citrate added is within the range of 0.1-0.5% by weight into the surimi, but, since the Hunter's whiteness is liable to lower in proportion as the amount of the citrate is increased, it is preferable for it to be added in a quantity between 0.1 and 0.2% by weight.

EXAMPLES 27-35

The effect of common salt added in conjunction with sodium carbonate.

Frozen surimi is prepared in a variety of compositions according to the process of Example 1, as shown in Table 4. After four months of cold storage at minus 30° C., the frozen surimi is made into musuwari kamaboko and suwari kamaboko in the same manner as in Example 1. The test results obtained in the same manner as in Example 1, with respect to both surimi and kamaboko, are shown in Table 4. The viscosity of the surimi is indicated by — meaning "not viscous", ± meaning "a little viscous", + meaning "viscous", + + meaning "viscous to a high degree", and + + + meaning "viscous to a very high degree".

TABLE 4

| Test lot | Additives (% by weight) Sugar | Additives (% by weight) Common salt | Additives (% by weight) Na$_2$CO$_3$ | pH Surimi | pH Musuwari kamaboko | Hunter's whiteness (%) Surimi | Hunter's whiteness (%) Musuwari kamaboko | Water drip from thawed surimi (%) | Jelly strength (g × cm) Musuwari kamaboko | Jelly strength (g × cm) Suwari kamaboko | Suwari (elasticity) of thawed surimi | Viscosity of surimi |
|---|---|---|---|---|---|---|---|---|---|---|---|---|
| C-8 | 6 | 0 | 0 | 7.17 | 7.01 | 20.6 | 40.0 | 3.8 | 270 | 280 | — | — |
| C-9 | 6 | 2.5 | 0 | 6.91 | 7.01 | 20.5 | 38.9 | — | 265 | 290 | + + | + + + |
| Ex. 27 | 6 | 0 | 0.04 | 7.45 | 7.25 | 20.3 | 39.7 | — | 330 | 420 | — | ± |
| Ex. 28 | 6 | 0.2 | 0.04 | 7.43 | 7.25 | 19.4 | 39.5 | 2.4 | 335 | 460 | — | + |
| Ex. 29 | 6 | 0.4 | 0.04 | 7.45 | 7.26 | 19.9 | 39.6 | 7.6 | 335 | 485 | — | + |
| Ex. 30 | 6 | 0.6 | 0.04 | 7.41 | 7.25 | 19.6 | 39.7 | — | 350 | 470 | — | + + |
| Ex. 31 | 6 | 0.8 | 0.04 | 7.38 | 7.26 | 19.0 | 39.7 | — | 340 | 500 | — | + + |
| Ex. 32 | 6 | 1 | 0.04 | 7.36 | 7.28 | 19.2 | 39.6 | — | 335 | 460 | ± | + + + |
| Ex. 33 | 6 | 1.5 | 0.04 | 7.34 | 7.30 | 19.8 | 39.5 | — | 330 | 445 | + | + + + |
| Ex. 34 | 6 | 2 | 0.04 | 7.30 | 7.32 | 20.2 | 39.5 | — | 330 | 420 | + | + + + |
| Ex. 35 | 6 | 2.5 | 0.04 | 7.21 | 7.30 | 20.2 | 39.3 | — | 335 | 400 | + | + + + |

C: Comparative Example
Ex.: Example of the present invention

As shown in Table 4, the water drip from the thawed surimi under pressure registers the highest when the quantity of NaCl added is 0.4% by weight, and no drip appears when the quantity of NaCl is 0.6% by weight or more. No drip appears for 0.04% by weight of Na$_2$CO$_3$.

The premature suwari of surimi at the time of thawing undergoes a change toward gelation as the concentration of common salt is increased; the change is slight for an NaCl concentration of 1% by weight, but distinct for a concentration of 1.5% by weight. Definite gelation is observed in the test of Comparative Example 9 (salted surimi).

The test lots of musuwari kamaboko prepared according to this invention definitely show satisfactory elasticity, compared with Comparative Examples 8 and 9. The elasticity is clearly satisfactory in the test lots of suwari kamaboko prepared according to this invention, compared with Comparative Examples 8 and 9.

From the above-stated results, it follows that the quantity of common salt required for imparting good viscosity and satisfactory cohesivity to suwari is preferably within the range of 0.6-1.0% by weight, within which range the addition does not affect suwari (elasticity) of surimi at the time of thawing to any substantial degree, and the water drip from the thawed surimi under pressure is negligibly small.

EXAMPLES 36-43

The effect of salts of organic acids in conjunction with common salts.

Frozen surimi is prepared in a variety of compositions according to the same process as in Example 1, as shown in Table 5. After six months of cold storage at minus 30° C., the frozen surimi is made into musuwari kamaboko and suwari kamaboko in the same manner as in Example 1. The salts or each organic acid are dissolved in 50 ml distilled water so as to adjust the ion strength to 0.025 against surimi and added to the fish meat after adjusting the pH value to 7 with NaOH or HCl. The test results obtained in the same manner as in Example 1, with respect to both surimi and kamaboko, are shown in Table 5. The toughness of the surimi after thawing (meat temperature: 5° C.) is determined by means of a food rheometer (Model NRM-2002J made by Fudo Kogyo) and represented push strength W (g) applied to a globular plunger with a diameter of 5 mm.

TABLE 5

| Test lot | Salt of an organic acid | Additives (% by weight) Sugar | Additives (% by weight) sorbitol | Additives (% by weight) Na$_2$CO$_3$ | Additives (% by weight) NaHCO$_3$ | Additives (% by weight) NaCl | Additives (% by weight) Salt of organic acid | pH Surimi | pH Musuwari kamaboko | Hunter's whiteness (%) Surimi | Hunter's whiteness (%) Musuwari kamaboko |
|---|---|---|---|---|---|---|---|---|---|---|---|
| C-10 | | 4 | 4 | 0 | 0 | 0 | 0 | 7.10 | 6.98 | 19.4 | 39.1 |
| Ex. 36 | | 4 | 4 | 0.04 | 0 | 0.6 | 0 | 7.38 | 7.30 | 18.4 | 39.6 |
| Ex. 37 | Na acetate | 4 | 4 | 0.04 | 0 | 0.6 | 0.21 | 7.36 | 7.30 | 18.5 | 40.9 |
| Ex. 38 | Na tartarate | 4 | 4 | 0.04 | 0 | 0.6 | 0.16 | 7.33 | 7.28 | 18.8 | 40.8 |
| Ex. 39 | Na marate | 4 | 4 | 0.04 | 0 | 0.6 | 0.15 | 7.37 | 7.28 | 18.5 | 40.6 |
| Ex. 40 | Na glucorate | 4 | 4 | 0.04 | 0 | 0.6 | 0.55 | 7.38 | 7.31 | 18.6 | 41.3 |
| Ex. 41 | Na citrate | 4 | 4 | 0.04 | 0 | 0.6 | 0.11 | 7.35 | 7.30 | 19.2 | 41.1 |
| Ex. 42 | Na citrate | 4 | 4 | 0.02 | 0.05 | 0.6 | 0.11 | 7.38 | 7.33 | 19.0 | 41.0 |
| Ex. 43 | Na citrate | 4 | 4 | 0 | 0.10 | 0.6 | 0.11 | 7.42 | 7.37 | 18.9 | 40.8 |

| Test lot | Water drip from thawed surimi (%) | Jelly strength (g × cm) Musuwari kamaboko | Jelly strength (g × cm) Suwari kamaboko | Toughness of thawed surimi (g) |
|---|---|---|---|---|
| C-10 | 3.0 | 320 | 310 | 121 |
| Ex. 36 | — | 370 | 400 | 134 |
| Ex. 37 | + | 350 | 395 | 138 |
| Ex. 38 | + | 350 | 390 | 119 |
| Ex. 39 | 1.0 | 375 | 400 | 140 |
| Ex. 40 | ± | 360 | 390 | 132 |
| Ex. 41 | — | 360 | 405 | 95 |
| Ex. 42 | — | 365 | 410 | 98 |

TABLE 5-continued

|  |  |  |  |  |
| --- | --- | --- | --- | --- |
| Ex. 43 | — | 370 | 415 | 90 |

C: Comparative Example
Ex.: Example of the present invention

As shown in Table 5, although the addition of $Na_2CO_3$ and/or $NaHCO_3$ effectively lowers the Hunter's whiteness of both surimi and kamaboko, some salts of organic acids counteract the lowering effect, sodium citrate being especially effective for this purpose.

With respect to the water drip from thawed surimi under pressure, the drip is exceptionally reduced in the test lots prepared according to this invention, compared with Comparative Example 10. With respect to the toughness of thawed surimi, it is discovered that sodium citrate renders the meat tender and tacky and prevents such meat from suwari (loss of good elasticity) at the time of thawing. The elasticity of musuwari kamaboko and suwari kamaboko is not adversely affected in the test lots prepared according to this invention.

The test proves that surimi can be improved remarkably, compared with Comparative Example 10, by addition of sodium citrate and common salt in conjunction with $Na_2CO_3$ and/or $NaHCO_3$.

EXAMPLES 44–48

The effect of surface-active agents.

Frozen surimi is prepared in a variety of compositions according to the same process as in Example 1, as shown in Table 6, and, after three months of cold storage at minus 30° C., the frozen surimi is made into musuwari kamaboko and suwari kamaboko in the same manner as in Example 1.

In this test, cotton seed oil monoglyceride, sorbitan monooleate, sugar ester (HLB 15), and propylene glycol monooleate are used as additives. Each of these additives are formed into an additive preparation in combination with $Na_2CO_3$ and sodium citrate through a process wherein the three additive ingredients are evenly dispersed in heat-melted sorbitol by means of a mixer to form crystals by cooling, which then are pulverized. Each of the four different preparations comprises sorbitol, a surface-active agent, $Na_2CO_3$ and citric acid Na in the proportion of 90.09%, 6.76%, 2.25% and 0.9%, respectively. The test results obtained in the same manner as in Example 1, with respect to surimi and kamaboko, are shown in Table 6.

TABLE 6

| Test lot | Surface-active agent | Additives (% by weight) | | | | | | pH | | Hunter's whiteness (%) | |
| --- | --- | --- | --- | --- | --- | --- | --- | --- | --- | --- | --- |
|  |  | Sugar | Sorbitol | Preparation | Surfactant | $Na_2CO_3$ | Na citrate | NaCl | Surimi | Musuwari kamaboko | Surimi | Musuwari kamaboko |
| C-11 |  | 4 | 4 | 0 | 0 | 0 | 0 | 0 | 7.78 | 7.09 | 19.1 | 34.1 |
| Ex. 44 |  | 4 | 4 | 0 | 0 | 0.04 | 0.1 | 0.6 | 7.36 | 7.32 | 19.0 | 34.7 |
| Ex. 45 | Cotton seed oil monoglyceride | 4 | (4)* | 4.34 | (0.3) | (0.04) | (0.1) | 0.6 | 7.34 | 7.33 | 22.6 | 37.2 |
| Ex. 46 | Sorbite monooleate | 4 | (4) | 4.34 | (0.3) | (0.04) | (0.1) | 0.6 | 7.35 | 7.32 | 22.5 | 36.6 |
| Ex. 47 | Sugar ester | 4 | (4) | 4.34 | (0.3) | (0.04) | (0.1) | 0.6 | 7.35 | 7.32 | 24.5 | 35.5 |
| Ex. 48 | Propylene glycol monooleate | 4 | (4) | 4.34 | (0.3) | (0.04) | (0.1) | 0.6 | 7.34 | 7.30 | 22.0 | 36.0 |

| Test lot | Water drip from thawed surimi (%) | Jelly strength (g × cm) | | Suwari (elasticity) of thawed surimi |
| --- | --- | --- | --- | --- |
|  |  | Musuwari kamaboko | Suwari kamaboko |  |
| C-11 | 2.0 | 380 | 405 | — |
| Ex. 44 | — | 430 | 560 | — |
| Ex. 45 | — | 475 | 550 | — |
| Ex. 46 | — | 450 | 540 | — |
| Ex. 47 | — | 420 | 510 | — |
| Ex. 48 | — | 430 | 530 | — |

*The figures in parentheses under "Additive" represent the additives included in the respective preparations each forming a 4.34% combination additive.

As shown in Table 6, it is observed that the Hunter's whiteness of both surimi and kamaboko improves markedly when a surface-active agent is added thereto in conjunction with other additives specified in the foregoing description of this invention. Thawed surimi to which a surface active agent is thus added shows no water drip nor suwari (loss of good elasticity) at the time of thawing. Cotton seed oil monoglyceride proves most effective, followed next by sorbitan monooleate, among the surface-active agents.

In the production of frozen surimi according to the present invention, an alkali carbonate and/or a sodium hydrogen carbonate is added thereto when the surimi is ground at a pH value not exceeding 7.5 when the surimi is put into cold storage. This method produces frozen surimi with satisfactory properties with respect to whiteness, elasticity and water holding capacity (no drip at the time of thawing) even after long periods of storage under refrigeration. The practice of this invention prevents frozen surimi from deteriorating through long periods of cold storage and ensures good whiteness and good elasticity of kamaboko produced thereby.

What is claimed is:

1. A method of producing frozen surimi not containing polyphosphates and possessing good coloration and good elasticity in a surimi-based product, comprising:
    washing minced fish meat;
    dehydrating the washed minced fish meat to give dehydrated minced fish meat;
    mixing the dehydrated minced fish meat;
    adding at least one compound selected from the group consisting of carbonates and bicarbonates in combination with an organic alkaline salt to the dehydrated minced fish meat during the mixing of the fish meat, so as to adjust the pH value of the fish meat to less than 7.5;

adding sodium chloride to the dehydrated minced fish meat during the mixing of the fish meat, in an amount of about 0.6 to 1.0% by weight; and freezing the resultant fish meat to produce frozen surimi.

2. A method according to claim 1, wherein the carbonates are selected from the group consisting of sodium carbonate, potassium carbonate, calcium carbonate, and magnesium carbonate; and the bicarbonates are selected from the group consisting of sodium bicarbonate and potassium bicarbonate.

3. A method according to claim 1, wherein the organic alkaline salt is selected from the group consisting of sodium citrate, calcium citrate, sodium acetate, calcium acetate, sodium tartrate, calcium tartrate and sodium gluconate.

4. A method according to claim 1, wherein one of the group of carbonates and bicarbonates is added to the dehydrated fish meat in an amount not less than 0.02% by weight.

5. A method according to claim 1, further comprising adding at least one edible surface active agent to the dehydrated minced fish meat.

6. A method of producing frozen surimi according to claim 1, wherein the carbonates, bicarbonates, and organic alkaline salt are added in the amounts of not more than 0.06% by weight, not more than 0.15% by weight, and 0.1 to 0.5% by weight, respectively, based on the total weight of the dehydrated minced fish meat.

* * * * *